United States Patent
Guen et al.

(10) Patent No.: US 9,819,003 B2
(45) Date of Patent: Nov. 14, 2017

(54) RECHARGEABLE BATTERY HAVING SHORT-CIRCUIT PROTRUSION

(71) Applicant: SAMSUNG SDI CO., LTD., Yongin-si, Gyeonggi-do (KR)

(72) Inventors: Min-Hyung Guen, Yongin-si (KR); Yong-Chul Seo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 306 days.

(21) Appl. No.: 14/445,698

(22) Filed: Jul. 29, 2014

(65) Prior Publication Data
US 2015/0099145 A1    Apr. 9, 2015

(30) Foreign Application Priority Data
Oct. 8, 2013   (KR) .................. 10-2013-0119955

(51) Int. Cl.
| H01M 4/00 | (2006.01) |
| H01M 2/34 | (2006.01) |
| H01M 2/04 | (2006.01) |
| H01M 2/30 | (2006.01) |

(52) U.S. Cl.
CPC ............ *H01M 2/345* (2013.01); *H01M 2/04* (2013.01); *H01M 2/30* (2013.01); *H01M 2200/00* (2013.01); *H01M 2200/20* (2013.01); *H01M 2220/20* (2013.01)

(58) Field of Classification Search
CPC .................................................. H01M 4/00
See application file for complete search history.

(56) References Cited

U.S. PATENT DOCUMENTS

| 2005/0058898 A1 | 3/2005 | Dokko |
| 2010/0279156 A1* | 11/2010 | Kim ............... H01M 2/0404 429/56 |
| 2011/0135976 A1 | 6/2011 | Byun |
| 2012/0315515 A1 | 12/2012 | Guen |

(Continued)

FOREIGN PATENT DOCUMENTS

| DE | 10 2012 200 868 A1 | 7/2013 |
| DE | 10-2012-200868 | * 7/2013 |

(Continued)

OTHER PUBLICATIONS

Patent Abstracts of Japan and Machine English Translation of JP 08-158016 A, Jun. 18, 1996, 14 Pages.

(Continued)

*Primary Examiner* — Jacob Marks
(74) *Attorney, Agent, or Firm* — Lewis Roca Rothgerber Christie LLP

(57) ABSTRACT

A rechargeable battery includes an electrode assembly including first and second electrodes; a case accommodating the electrode assembly; a cap plate having a short-circuit opening; a first terminal coupled to the first electrode; a second terminal coupled to the second electrode; and a short-circuit member at the cap plate, corresponding to the short-circuit opening, and configured to deform to electrically couple the first and second electrodes; and a short-circuit protrusion at the second terminal and configured to contact the short-circuit member, wherein a surface roughness of the short-circuit protrusion is greater than that of the cap plate.

15 Claims, 6 Drawing Sheets

(56) References Cited

U.S. PATENT DOCUMENTS

2012/0315516 A1  12/2012  Kim
2013/0101875 A1   4/2013  Kim et al.

FOREIGN PATENT DOCUMENTS

| JP | 08-158016 A | 6/1996 |
|---|---|---|
| KR | 10-0658686 | 12/2006 |
| KR | 10-2011-0065277 | 6/2011 |
| KR | 10-1078788 | 11/2011 |
| KR | 10-2012-0136267 | 12/2012 |
| KR | 10-2013-0042882 | 4/2013 |
| WO | WO 97/44835 A1 | 11/1997 |

OTHER PUBLICATIONS

EPO Search Report dated Mar. 24, 2015, for corresponding European Patent application 14187992.4, (6 pages).
KIPO Office Action dated Jul. 13, 2016, for corresponding Korean Patent Application No. 10-2013-0119955 (7 pages).
Korean Office Action dated Jan. 24, 2017 of the corresponding Korean Patent Application No. 10-2013-0119955, noting listed reference in this IDS (6 pages).
European Office Action dated Mar. 17, 2017 of the corresponding European Patent Application No. 14187992.4 (4 pages).
KIPO Notice of Allowance dated Jul. 14, 2017, for corresponding Korean Patent Application No. 10-2013-0119955 (5 pages).

* cited by examiner

RECHARGEABLE BATTERY HAVING SHORT-CIRCUIT PROTRUSION

CROSS-REFERENCE TO RELATED APPLICATION

This application claims priority to and the benefit of Korean Patent Application No. 10-2013-0119955 filed in the Korean Intellectual Property Office on Oct. 8, 2013, the entire contents of which are incorporated herein by reference.

BACKGROUND

1. Field

The described technology relates generally to a rechargeable battery.

2. Description of the Related Art

A rechargeable battery differs from a primary battery in that it is designed to be repeatedly charged and discharged, while the latter is not designed to be recharged.

A low-capacity rechargeable battery is used in, for example, small portable electronic devices such as mobile phones, laptop computers, and camcorders, while a high-capacity rechargeable battery is used as, for example, a power source for driving a motor of a hybrid vehicle and the like.

Recently, a high power rechargeable battery using a non-aqueous electrolyte and having high energy density has been developed, and the high power rechargeable battery is formed by coupling a plurality of rechargeable batteries in series to be used as a power source for driving a motor of a device requiring a large amount of electric power, for example, an electric vehicle and the like.

In addition, a high-capacity rechargeable battery may include a plurality of rechargeable batteries connected in series, and each rechargeable battery may be formed in, for example, a cylindrical shape, a prismatic shape, and the like.

When internal pressure of one of the rechargeable batteries, with its case made of, for example, metal and the like, is increased due to, for example, an abnormal reaction, the rechargeable battery may explode or catch fire.

The above information disclosed in this Background section is only for enhancement of understanding of the background of the described technology and therefore it may contain information that does not form the prior art that is already known in this country to a person of ordinary skill in the art.

SUMMARY

Accordingly, embodiments of the present invention provide a rechargeable battery having reduced contact resistance when a short-circuit occurs to prevent the rechargeable battery from exploding or catching fire.

A rechargeable battery according to an example embodiment includes an electrode assembly including first and second electrodes; a case accommodating the electrode assembly; a cap plate on the case and having a short-circuit opening; a first terminal coupled to the first electrode; a second terminal coupled to the second electrode; a short-circuit member at the cap plate, corresponding to the short-circuit opening, and configured to deform to electrically couple the first and second electrodes; and a short-circuit protrusion at the second terminal and configured to contact the short-circuit member, wherein a surface roughness of the short-circuit protrusion is greater than that of the cap plate.

The shaft-circuit protrusion may be integrally formed with and may protrude from the second terminal.

The surface roughness of the second terminal may be greater than that of the cap plate.

The surface roughness of the short-circuit protrusion may be greater than that of parts of the second terminal other than the short-circuit protrusion.

The second terminal may include a plurality of micro-sized protrusions.

The plurality of micro-sized protrusions may be only on the short-circuit protrusion of the second terminal.

The surface roughness of the short-circuit protrusion may be about 1.3 to about 10 times greater than that of the cap plate.

The average length of micro-sized protrusions producing the surface roughness of the short-circuit protrusions may be about 0.5 μm to about 100 μm.

The short-circuit protrusions may protrude in a ring shape.

The short-circuit protrusions may be etched by an acid or a base, or may be sandblasted.

The short-circuit protrusions may be processed by stamping using a stamp comprising micro-sized protrusions.

The short-circuit protrusion may be coupled to and may protrude from the second terminal.

The surface roughness of the short-circuit protrusion may be greater than that of the parts of the second terminal other than the short-circuit protrusion.

According to an example embodiment, because the surface roughness of the short-circuit protrusion is increased, contact resistance is reduced when the short-circuit member contacts the short-circuit protrusion.

DETAILED DESCRIPTION

Figure 1:
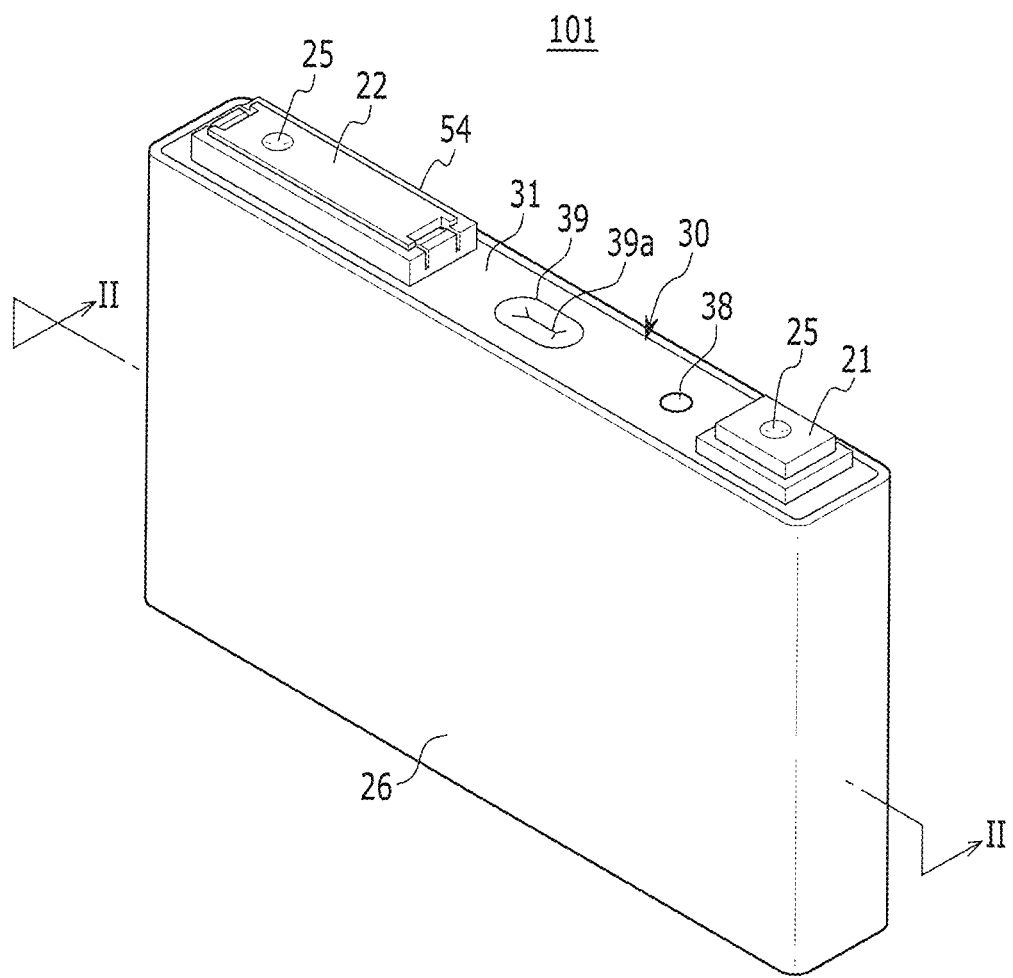
FIG. 1 is a perspective view of a rechargeable battery according to a first example embodiment.

The present invention will be described more fully hereinafter with reference to the accompanying drawings, in which example embodiments of the invention are shown.

As those skilled in the art would realize, the described embodiments may be modified in various different ways, all without departing from the spirit or scope of the present invention.

Like reference numerals designate like elements throughout the specification and the drawings. It will be understood that when an element or layer is referred to as being "on" or "connected to" another element or layer, it may be directly on or connected to the other element or layer or intervening elements or layers may be present. When an element is referred to as being "directly on" or "directly connected to" another element or layer, there are no intervening elements or layers present. As used herein, the term "and/or" includes any and all combinations of one or more of the associated listed items. Further, the use of "may" when describing embodiments of the present invention refers to "one or more embodiments of the present invention."

Figure 2:
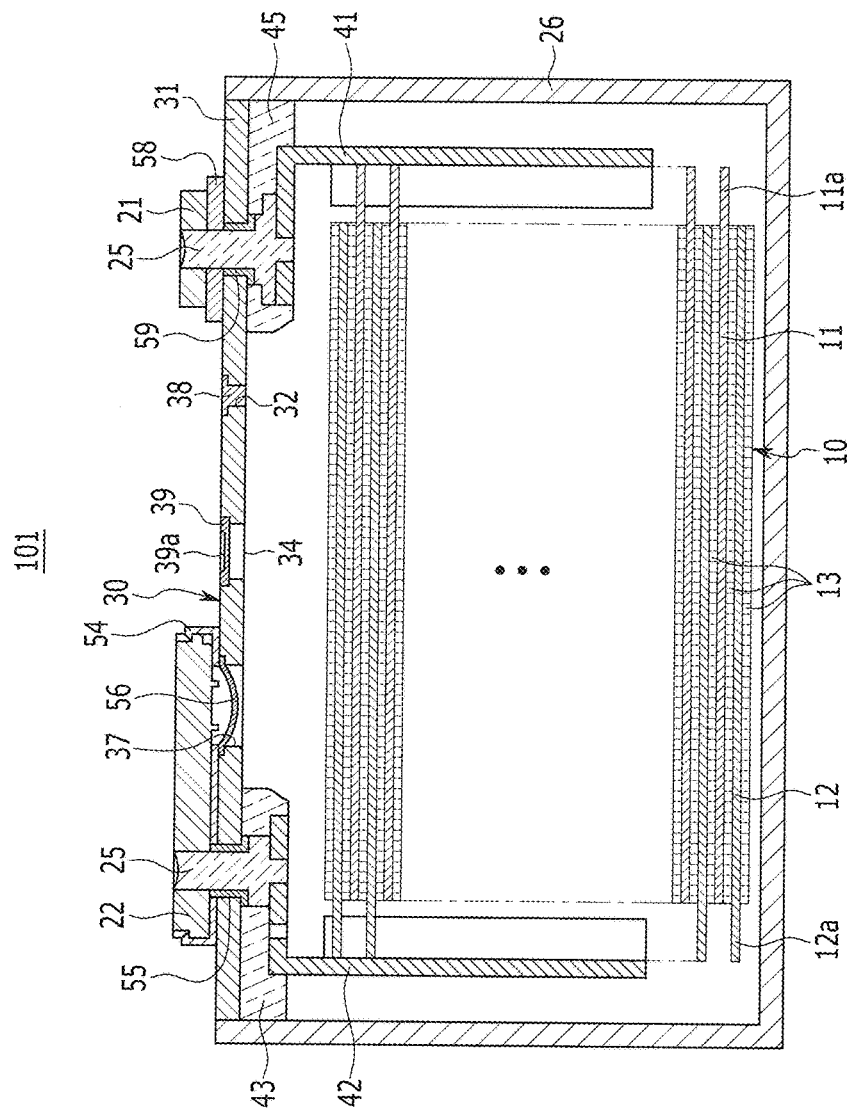
FIG. 2 is a cross-sectional view of FIG. 1, taken along the line II-II.

FIG. 1 is a perspective view of a rechargeable battery according to a first example embodiment, and FIG. 2 is a cross-sectional view of FIG. 1, taken along the line II-II.

Referring to FIG. 1 and FIG. 2, the rechargeable battery 101 according to an example embodiment includes an electrode assembly 10 formed by winding a positive electrode (e.g., a first electrode) 11 and a negative electrode (e.g., a second electrode) 12 with a separator 13 interposed therebetween, a case 26 in which the electrode assembly 10 is accommodated (e.g., stored), and a cap assembly 30 combined to or mounted at an opening of the case 26.

The rechargeable battery 101 according to the present example embodiment is illustrated as a prism-shaped lithium ion rechargeable battery.

However, the present invention is not limited thereto, and it can be applied to various types of batteries, such as a lithium polymer battery or variously shaped batteries, such as a cylindrical battery and the like.

The positive electrode 11 and the negative electrode 12 each include coated regions where an active material is coated on a current collector formed of a thin metal foil and uncoated regions 11a and 12a where the active material is not coated thereon.

The positive electrode uncoated region 11a is formed at one lateral end of the electrode assembly 10 along a length direction thereof, and the negative electrode uncoated region 12a is formed at the other lateral end of the electrode assembly 10 along the length direction thereof.

The positive electrode 11 and the negative electrode 12 are wound together and the separator 13, which operates as an insulator, is interposed between them.

However, the present invention is not limited thereto, and the electrode assembly 10 may be formed having a layered structure in which the negative electrode and the positive electrode, respectively formed of a plurality of sheets, are layered while the separator is interposed between them.

The case 26 may be roughly formed in a shape of a cuboid, and an opening may be formed at one side.

The case 26 may be made of a metal, such as aluminum, stainless steel, or the like.

The cap assembly 30 includes a cap plate 31 covering the opening of the case 26, a first terminal 21 protruding out of the cap plate 31 and coupled to (e.g., electrically connected to) the positive electrode 11, and a second terminal 22 protruding out of the cap plate 31 and coupled to (e.g., electrically connected to) the negative electrode 12.

The cap plate 31 may be formed in an elongated plate shape in one direction and is combined to the opening of the case 26.

The cap plate 31 includes a sealing cap 38 provided in an electrolyte injection opening 32 and a vent plate 39 which is provided in a vent opening 34 (e.g., a vent hole). The vent plate 39 is formed with a notch 39a set or configured to open at a reference pressure (e.g., a predetermined pressure).

The first and second terminals 21 and 22 are provided to protrude upwards from the cap plate 31.

The first terminal 21 is coupled to (e.g., electrically connected to) the positive electrode 11 through a current collecting tab 41, and the second terminal 22 may be coupled to (e.g., electrically connected to) the negative electrode 12 through a current collecting tab 42.

However, the present invention is not limited thereto, and the first terminal 21 may be coupled to the negative electrode 12, while the second terminal 22 may be coupled to the positive electrode 11.

As shown in FIG. 1 and FIG. 2, the first terminal 21 may be formed in a rectangular plate shape.

The first terminal 21 is coupled to (e.g., electrically connected to) the positive electrode 11 through a connecting terminal 25 coupled to (e.g., bonded to) the current collecting tab 41.

The connecting terminal 25 coupled to (e.g., combined to) the first terminal 21 may have substantially the same structure as the connecting terminal 25 coupled to (e.g., combined to) the second terminal 22.

A gasket 59 for sealing is provided between the connecting terminal 25 and the cap plate 31 and is inserted into an opening (e.g., a hole) that the connecting terminal 25 penetrates, and a lower insulating member 45 is provided under the cap plate 31 to insulate the first terminal 21 from the current collecting tab 41 at the cap plate 31.

A connecting plate 58 coupling (e.g., electrically connecting) the first terminal 21 and the cap plate 31 is provided at the bottom side of the first terminal 21.

The connecting plate 58 is be penetrated by the connecting terminal 25 and is disposed between the cap plate 31 and the first terminal 21.

Having such a structure, the cap plate 31 may be coupled to (e.g., electrically connected to) the first electrode 21.

Figure 3:
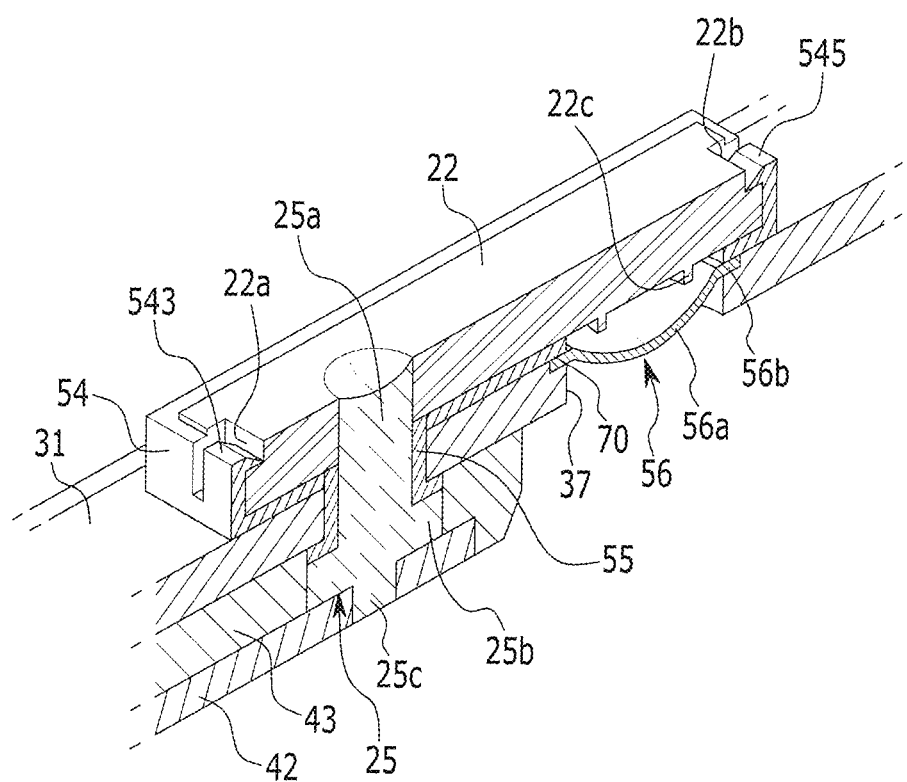
FIG. 3 is a partially cut-away perspective view of the rechargeable battery according to the first example embodiment.

As shown in FIG. 1, FIG. 2, and FIG. 3, the second terminal 22 may be formed in a rectangular plate shape.

The second terminal 22 may be coupled to (e.g., electrically connected to) the negative electrode 12 through the connecting terminal 25 coupled to (e.g., bonded to) the current collecting tab 42.

The connecting terminal 25 includes a pillar portion 25a which penetrates the cap plate 31 and the second terminal 22 and has its upper part fixed to the second terminal 22, a lower flange portion 25b which protrudes outwards from a lower end of the pillar portion 25a, and a lower protrusion 25c protruding downwards from a lower end of the pillar portion 25a, being inserted into the current collecting tab 42 and fixed thereto by, for example, welding.

A gasket 55 for sealing is provided between the connecting terminal 25 and the cap plate 31 and is inserted into an opening (e.g., a hole) that the connecting terminal 25 penetrates, and a lower insulating member 43 may be provided under the cap plate 31 to insulate the first terminal 22 from the current collecting tab 42 at the cap plate 31.

Meanwhile, a short-circuit protrusion 22c protrudes towards a short-circuit opening 37 (e.g., a short-circuit hole) at the bottom side of the second terminal 22.

The second terminal 22 is elongated along one direction to cover the short-circuit opening 37.

An upper insulating member 54 is provided between the second terminal 22 and the cap plate 31 to electrically insulate them.

Because the cap assembly 30 includes a short-circuit member 56 which short-circuits (e.g., electrically couples) the positive electrode 11 and the negative electrode 12, the short-circuit member 56 is coupled to (e.g., electrically connected to) the cap plate 31 and is deformed (e.g., inverted) to contact (e.g., to be connected to) the second terminal 22 when internal pressure of the rechargeable battery 101 is increased (e.g., when internal pressure of the rechargeable battery 101 is increased above a predetermined level).

The short-circuit opening 37 is formed in the cap plate 31, and the short-circuit member 56 is disposed between the upper insulating member 54 and the cap plate 31 at the short-circuit opening 37.

The short-circuit member 56 includes a curved portion 56a which is convexly curved downwards in an arc shape and an edge portion 56b which is formed outside of (e.g., around) the curved portion 56a and fixed to the cap plate 31.

Having such a structure, the short-circuit member 56, convexly curved downwards, may be deformed to be convexly curved upwards such that the short-circuit protrusion 22c contacts the short-circuit member 56 when internal pressure of the rechargeable battery 101 is increased.

The upper insulating member 54 includes supporting protrusions 543 and 545 which are formed to protrude from respective lateral ends of the upper insulating member 54 along a length direction thereof.

The upper insulating member 54 includes a lower plate formed in a rectangular plate shape and a side wall protruding from lateral ends of the lower plate.

The supporting protrusions 543 and 545 may contact supporting steps 22a and 22b which are formed in the second terminal 22 and support the second terminal 22.

The supporting steps 22a and 22b are formed to be stepped from respective lateral ends of the second terminal 22 along a length direction thereof and are respectively coupled to (e.g., combined to) the supporting protrusions 543 and 545.

The supporting protrusions 543 and 545 are formed with a catching portion protruding towards the inside of the lower plate, the catching portion contacts top surfaces of the supporting steps 22a and 22b and supports the second terminal 22.

Figure 4:
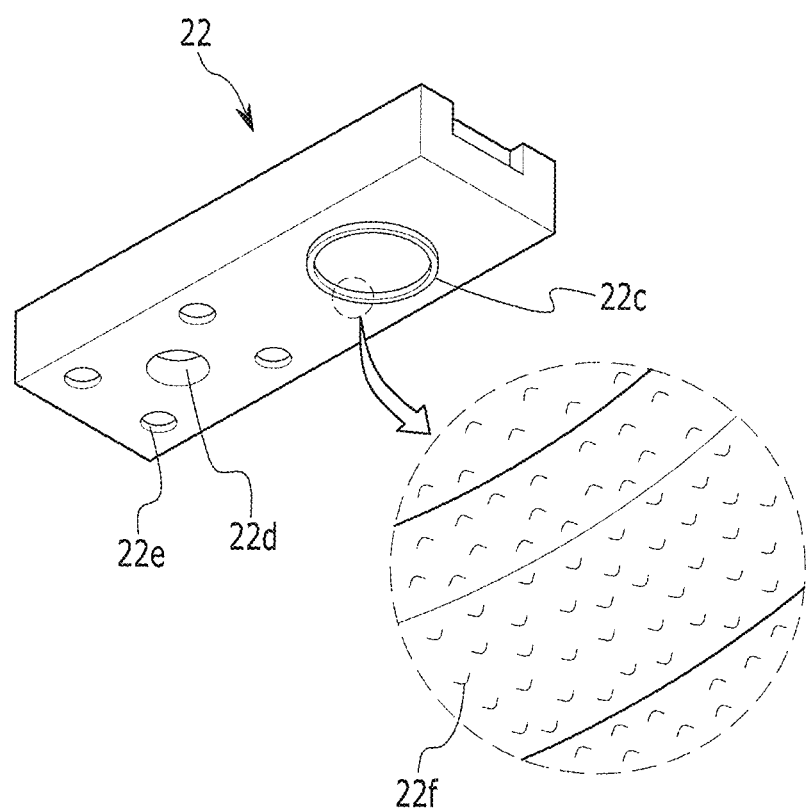
FIG. 4 is a perspective view of a second terminal viewed from the bottom according to the first example embodiment.

As shown in FIG. 4, the second terminal 22 is formed in a rectangular plate shape, and the short-circuit protrusion 22c protruding towards the short-circuit member 56 may be integrally formed with the second terminal 22 at a bottom side thereof.

However, the present invention is no limited thereto, and the short-circuit protrusion 22c may be attached to the second terminal 22 by, for example, welding and the like.

The second terminal 22 is formed with a terminal opening 22d (e.g., a terminal hole) and a supporting groove 22e into which a supporting protrusion formed in the cap plate is inserted.

The short-circuit protrusion 22c is formed to protrude downwards from a bottom side of the second terminal 22 and is formed to be elongated in (e.g., protrude in) a circular ring shape.

However, the present invention is no limited thereto, and the short-circuit protrusion 22c may be formed to protrude in various shapes.

The surface roughness ($R_a$) of the short-circuit protrusion 22c is greater than that of the cap plate 31.

To achieve this, the surface of the second terminal 22 may be processed by various methods, for example, a sandblasting process, acid or base etching, stamping using a stamp with micro-sized protrusions, and the like.

Accordingly, in the described embodiment, the short-circuit protrusion 22c is formed with micro-sized protrusions 22f, and these micro-sized protrusions 22f may be formed over substantially the entire surface area of the second terminal 22 as all of the surface area is processed.

The surface roughness ($R_a$) of the short-circuit protrusion 22c may be about 1.3 to about 10 times greater than that of the cap plate 31.

The average length of the micro-sized protrusions 22f producing the surface roughness ($R_a$) of the short-circuit protrusion 22c may be about 0.5 μm to about 100 μm.

In the present example embodiment, as the surface roughness of the short-circuit protrusion 22c increases, the deformed short-circuit member 56 has a larger contact area when contacting the short-circuit protrusion 22c.

When the contact area between the short-circuit protrusion 22c and the short-circuit member 56 is small, the short-circuit member 56 may be more easily melted due to the contact resistance between the short-circuit protrusion 22c and the short-circuit member 56, thereby stopping the short-circuit.

Figure 5A:
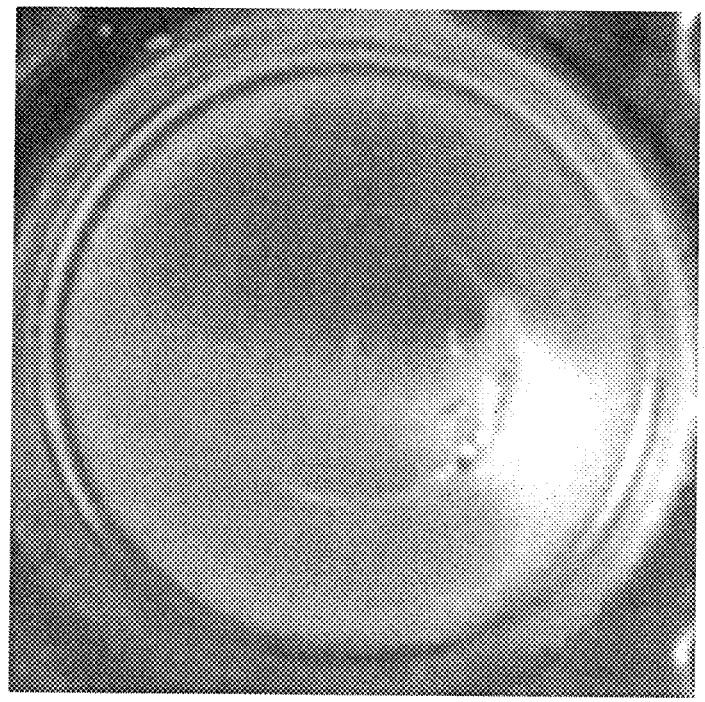
FIG. 5A is a photograph showing a part of the second terminal before the surface processing.

However, according to the present example embodiment, because the short-circuit member 56 contacts the short-circuit protrusion 22c through the micro-sized protrusions 22f, the contact resistance may be reduced as the number of contact points is increased. FIG. 5A is a photograph showing a part of the second terminal before the surface processing, and FIG. 5B is a photograph showing the part of the second terminal after the surface processing.

Figure 5B:
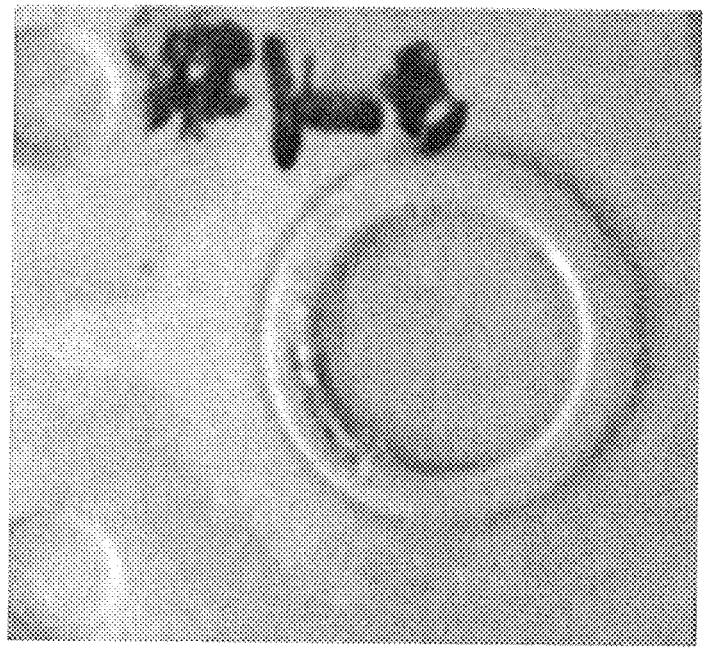
FIG. 5B is a photograph showing the part of the second terminal after the surface processing.

As shown in FIG. 5A, the second terminal 22 has a smooth surface before the surface processing, but the surface roughness is increased, as shown in FIG. 5B, after surface processing by acid etching.

Moreover, impurities on the surface of the second terminal 22 may be removed if the surface is processed by acid etching and organic materials such as oil, carbon, and the like may also be removed (e.g., completely removed).

A sandblasting process is a process in which the surface of the second terminal 22 is processed by being sprayed with tiny materials such as sand and the like, which increases the surface roughness of the second terminal 22.

A stamping process is a process in which the short-circuit protrusion and the second terminal 22 are stamped with a stamp having micro-sized protrusions, which increases the surface roughness of the short-circuit protrusion 22c.

Figure 6:
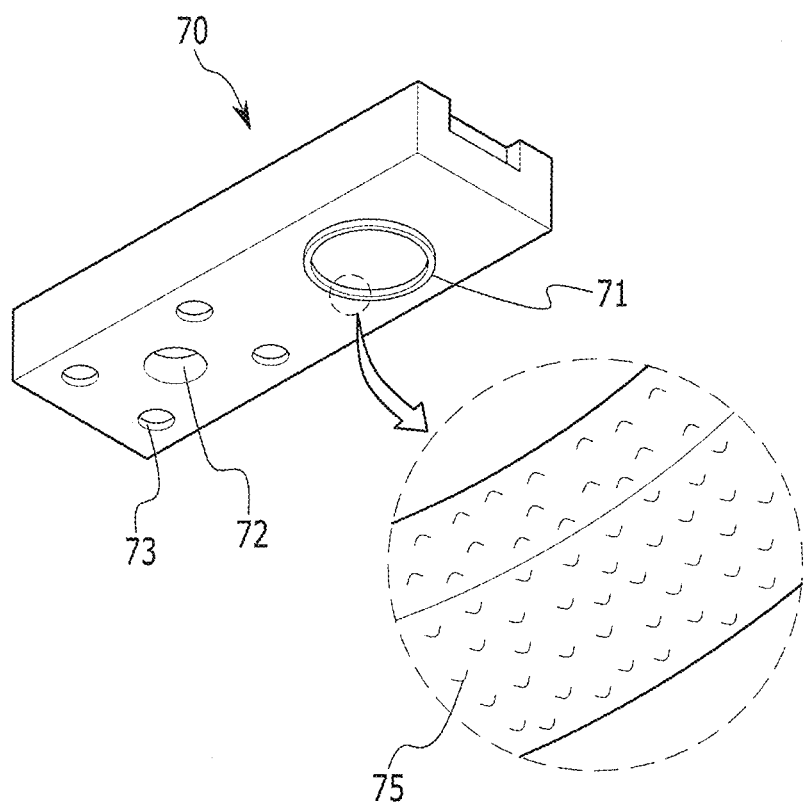
FIG. 6 is a perspective view of a second terminal viewed from the bottom according to a second example embodiment.

FIG. 6 is a perspective view of a second terminal according to a second example embodiment.

Referring to FIG. 6, because a rechargeable battery according to the present example embodiment has substantially the same structure as the first example embodiment described above, except for a second terminal, a repeated description of the same structure will be omitted.

The second terminal 70 according to the present example embodiment is formed in a rectangular plate shape, and a short-circuit protrusion 71 is formed to protrude towards the short-circuit member 56 from a bottom side of the second terminal 70.

The second terminal 70 is formed with a terminal opening 72 (e.g., a terminal hole) into which the connecting terminal is inserted, and a supporting groove 73 into which the supporting protrusion formed in the cap plate 31 is inserted.

The short-circuit protrusion 71 protrudes downwards from a bottom side of the second terminal 70 and is elongated in (e.g., protrude in) a circular ring shape.

However, the present invention is not limited thereto, and the short-circuit protrusion 71 may be formed in various suitable shapes.

The surface roughness ($R_a$) of the short-circuit protrusion 71 may be greater than that of the cap plate 31.

The surface roughness ($R_a$) of the short-circuit protrusion 71 may be greater than that of the parts of the second terminal 70 other than the short-circuit protrusion 71.

That is, only the surface of the short-circuit protrusion 71 may be processed, and the surface of the second terminal 70 other than the short-circuit protrusion 71 may not be processed.

To achieve this, the surface of the short-circuit protrusion 71 may be processed by various suitable methods, for example, a sandblasting process, acid or base etching, and stamping using a stamp with micro-sized protrusions, and/or the like.

To achieve this, only the short-circuit protrusion 71 may be etched by an acid or base, and the short-circuit protrusion 71, with its surface processed, may be coupled to (e.g., fixed to) the second terminal by, for example, welding.

Accordingly, the short-circuit protrusion 71 may be formed with micro-sized protrusions 75, and these micro-sized protrusions 75 may be formed only in the short-circuit protrusion 71 of the second terminal 70.

The surface roughness ($R_a$) of the short-circuit protrusion 71 may be about 1.3 to about 10 times greater than that of the other remaining parts of the second terminal 70 other than the short-circuit protrusion 71.

The average length of the micro-sized protrusions 75 producing the surface roughness ($R_a$) of the short-circuit protrusion 71 may be about 0.5 µm to about 100 µm.

In the present example embodiment, as the surface roughness of the short-circuit protrusion 71 increases, the deformed short-circuit member 56 has a larger contact area when contacting the short-circuit protrusion 71.

Accordingly, contact resistance between the short-circuit member 56 and the short-circuit protrusion 71 may be reduced.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and their equivalents.

Description of Reference Symbols

| | |
|---|---|
| 101: rechargeable battery | 10: electrode assembly |
| 11: positive electrode | 11a: positive electrode uncoated region |
| 12: negative electrode | 12a: negative electrode uncoated region |
| 13: separator | 21: first terminal |
| 22, 70: second terminal | 22a, 22b: supporting step |
| 22c, 71: short-circuit protrusion | 22d, 72: terminal opening |
| 22e, 73: supporting groove | 22f, 75: micro-sized protrusion |
| 26: case | 30: cap assembly |
| 31: cap plate | 37: short-circuit opening |
| 54: upper insulating member | 543, 545: supporting protrusion |
| 55, 59: sealing gasket | 56: short-circuit member |
| 56a: curved portion | 56b: edge portion |
| 58: connecting plate | |

What is claimed is:

1. A rechargeable battery comprising:
an electrode assembly comprising first and second electrodes;
a case accommodating the electrode assembly;
a cap plate on the case and having a short-circuit opening;
a first terminal coupled to the first electrode;
a second terminal coupled to the second electrode;
a short-circuit member at the cap plate, corresponding to the short-circuit opening, and configured to deform to electrically couple the first and second electrodes; and
a short-circuit protrusion at the second terminal and configured to contact the short-circuit member, the short-circuit protrusion comprising a plurality of micro-sized protrusions, wherein
a surface roughness of the short-circuit protrusion is greater than that of the cap plate.

2. The rechargeable battery of claim 1, wherein the short-circuit protrusion is integrally formed with and protrudes from the second terminal.

3. The rechargeable battery of claim 2, wherein the surface roughness of the second terminal is greater than that of the cap plate.

4. The rechargeable battery of claim 2, wherein the surface roughness of the short-circuit protrusion is greater than that of the parts of the second terminal other than the short-circuit protrusion.

5. The rechargeable battery of claim 1, wherein a plurality of micro-sized protrusions are only on the short-circuit protrusion of the second terminal.

6. The rechargeable battery of claim 1, wherein the surface roughness of the short-circuit protrusion is about 1.3 to about 10 times greater than that of the cap plate.

7. The rechargeable battery of claim 1, wherein an average length of the micro-sized protrusions producing the surface roughness of the short-circuit protrusion is about 0.5 µm to about 100 µm.

8. The rechargeable battery of claim 1, wherein the short-circuit protrusion protrudes in a ring shape.

9. The rechargeable battery of claim 1, wherein the short-circuit protrusion is sandblasted.

10. The rechargeable battery of claim 1, wherein the short-circuit protrusion is stamped with a stamp comprising micro-sized protrusions.

11. The rechargeable battery of claim 1, wherein the short-circuit protrusion is coupled to and protrudes from the second terminal.

12. The rechargeable battery of claim 11, wherein the surface roughness of the short-circuit protrusion is greater than that of the parts of the second terminal other than the short-circuit protrusion.

13. The rechargeable battery of claim 1, wherein the short-circuit protrusion protrudes from the second terminal and has a ring shape.

14. A rechargeable battery comprising:
an electrode assembly comprising first and second electrodes;
a case accommodating the electrode assembly;
a cap plate on the case and having a short-circuit opening;
a first terminal coupled to the first electrode;
a second terminal coupled to the second electrode;
a short-circuit member at the cap plate, corresponding to the short-circuit opening, and configured to deform to electrically couple the first and second electrodes; and
a short-circuit protrusion at the second terminal and configured to contact the short-circuit member, wherein
a surface roughness of the short-circuit protrusion is greater than that of the cap plate, and
the second terminal comprises a plurality of micro-sized protrusions.

15. A rechargeable battery comprising:
an electrode assembly comprising first and second electrodes;
a case accommodating the electrode assembly;
a cap plate on the case and having a short-circuit opening;
a first terminal coupled to the first electrode;
a second terminal coupled to the second electrode;
a short-circuit member at the cap plate, corresponding to the short-circuit opening, and configured to deform to electrically couple the first and second electrodes; and a short-circuit protrusion at the second terminal and configured to contact the short-circuit member, wherein
a surface roughness of the short-circuit protrusion is greater than that of the cap plate, and
the short-circuit protrusion is etched by an acid or a base.

* * * * *